Patented Sept. 17, 1946

2,407,750

UNITED STATES PATENT OFFICE 2,407,750

TEMPERATURE SENSITIVE RESISTOR

Frederick Gordon Smith, Toronto, Ontario, Canada, assignor to Research Consultants Limited, Toronto, Ontario, Canada, a corporation of Ontario No Drawing. Application February 23, 1944,
Serial No. 523,571

14 Claims. (Cl. 201—76)

This invention relates to a family of temperature sensitive resistance materials and particularly to resistors constructed of such materials which thereby provide a very high negative temperature coefficient of resistance.

It is a general object of the present invention to provide improved resistors and resistance materials having high, uniform and stable negative temperature coefficients of resistance.

More particularly it is an object of the invention to provide temperature sensitive resistors composed of true titanates of certain metals of group II of the periodic table of elements.

An important object of the invention consists in the provision of resistors of one crystalline phase composed of titanates of the metals in group IIA of the periodic table of elements excluding mercury.

A further object of the invention consists in the provision of a family of titanate resistors providing a wide range of resistance coefficients which overlap so as to permit the selection of resistance ranges for any desired purpose.

An important feature of each of the resistors is its extremely wide variation in resistance with temperature change together with extreme stability in air or oxygen up to the melting point of the material which melting point is above the melting points of most metals and of most materials in commercial usage whereby the resistors may form the essential element of resistance thermometers or the like.

An extremely important feature of each of the materials is the fact that it is composed of one single crystalline phase so that it can be formed into minute resistors without causing any observable change in the temperature coefficient of resistance, and which permits positive duplication of the resistance curve at any time.

Other and further objects and features of the invention will be more fully understood by those skilled in the art upon a consideration of the following specification wherein are disclosed several exemplary embodiments of the invention with the understanding that such changes and modifications may be made therein as fall within the scope of the appended claims without departing from the spirit of the invention.

The resistance materials of the present invention are in a chemical sense titanates of the metals in group IIA of the periodic table of elements, excluding mercury, and the general formula expressive of these titanates may be written as follows:

$$MO \cdot TiO_2$$

where M is magnesium, zinc, cadmium or berryllium. Each of these compounds is a true titanate and comprises a single crystalline phase which for the magnesium compound is orthorhombic and for the zinc compound is cubic.

The several compounds are prepared by combining one molecule of the monoxide of the base metal with one molecule of titanium dioxide ($TiO_2$). The constituent oxides in powdered form are carefully mixed and heated to a high temperature in atmosphere thereby combining the ingredients. The several compounds may be prepared by sintering at a temperature below their respective melting points or they may be melted. A temperature of 1300° C. is sufficient to melt the cadmium titanate; 1400° C. is sufficient to melt the zinc titanate; 1650° C. is sufficient to melt the magnesium titanate.

Each of these titanates is a hard, strong, stable crystalline compound unchanging in oxygen or air up to its melting point which in the case of the magnesium compound is approximately 1610° C. The zinc compound melts somewhat above 1300° C. whereas the cadmium compound begins to decompose slightly above 1000° C.

Each of the compounds can be worked in air with any kind of combustion torch without decomposition. They can also be melted in platinum crucibles and poured or cast in any desired form like metal. Each of the compounds is clear, transparent, and almost colorless. Following any working to change the shape or size of a mass of the material it is preferably heat treated to a dull red heat in air or in oxygen after being brought to its final form to make certain that all of the titanium present is in the tetravalent form.

The material is non-reactive with platinum even at temperatures above the melting point of the material which permits the use of platinum crucibles and platinum wire for terminals or heating elements for the resistors. An important feature is that the thermal expansion of the serveral resistor materials is so similar to that of platinum that no cracking takes place when the resistance compound is cast about the ends of platinum wires which are to act as terminals.

The compositions are cheap to manufacture both because of the simple process of forming them and because of the ready availability at low prices of the basic materials. Pure titanium dioxide is readily available at a low price and the same is true of the required oxides of magnesium, zinc, cadmium and beryllium.

As has been previously mentioned the resistors constructed in accordance with this invention have extremely high negative temperature coefficients which makes them available for a number of important uses some of which will later be explained, but before going into detail as to the range of resistance with temperature changes it might be well to point out some of the advantages of the new resistor materials. There is no aging of the material in the sense that with change in age there is no change in resistance or temperature coefficient of resistance such as is commonly the case with mixed oxide resistors.

Resistors constructed of the new materials have extremely low "thermal noise" (variation of total resistance due to variation of contact resistance between the granules of powdered or compressed resistors) which is a common fault of powdered carbon and mixed oxide resistors.

Because of their stability in air titanate resistors do not require vacuum or gas filled envelopes.

Each titanate resistor occurs only in one crystalline phase and hence can be made in any desired small size with no observable change in the temperature coefficient of resistance. In this connection it may be pointed out that resistors using the new materials have been prepared complete with platinum leads having a total weight of only .001 grams. With two phase resistors, or powdered oxide resistors and carbon types, the temperature coefficient changes with the physical size, especially as the total mass approaches the size of the individual phases or grains. This improvement is extremely important because in certain types of calorimeters, small mass and hence small heat capacity of the temperature measuring device is an advantage permitting much superior results in use.

Each of the titanate compounds mentioned herein has an extremely high specific resistance at atmospheric temperature and each shows a relatively rapid lowering of specific resistance with increase in temperature. The curve of temperature coefficient of resistance of each of these titanates shows a point of inflection the temperature of which may be termed the "critical" temperature. This coefficient is less negative above the critical temperature than it is below the critical temperature but for all temperatures above and all temperatures below the critical temperature the coefficient in each case remains constant.

Except at the point of inflection mentioned above the relationship between resistance and temperature in any of the compounds may best be illustrated by the formula $$R = ae^{-bT}$$

where R is the resistance in ohms, $a$ is a constant dependent on the physical dimensions of the resistor element, $e$ is the base of Naperian logarithms, $b$ is the temperature coefficient of resistance and T is the absolute temperature.

It is however, more convenient to express the coefficient in terms of the "temperature rise or fall required to respectively decrease or increase the resistance by a factor of two." This temperature change will be herein termed the "half resistance temperature." The following tabulation has been determined by experiment with the several resistors

|  | Half resistance temperature | | Critical temperature |
|---|---|---|---|
|  | Below critical temperature | Above critical temperature |  |
|  | °C. | °C. | °C. |
| MgO.TiO$_2$ | 34 | 55 | 780 |
| ZnO.TiO$_2$ | 30 | 76 | 560 |
| CdO.TiO$_2$ | 14 | 94 | 350 |

Because of the constant temperature coefficient of resistance above or below the critical temperature, standard scales may be prepared for measuring or recording devices for temperature which can be made to read in ohms, when the temperature of the resistor is changed to vary its resistance, or in degrees of temperature when the resistor is used as a thermometer. It will be apparent in either case, that if the same titanate resistor species is used, one calibration point only is needed to fix the instrument reading to the correct resistance or temperature. With mixed oxide and carbon resistors however, the temperature coefficient changes with small changes in composition and/or particle sizes, so that a full recording scale must of necessity be prepared for each and every resistor which is required to perform quantitatively in measuring instruments.

A single magnesium titanate resistor may be used to provide the equivalent of a complete series of resistances from what is commonly regarded as an excellent insulator having a specific resistance of $10^{14}$ ohms at room temperature to a good conductor of 50 ohms specific resistance at 1600° C. This extremely wide range is not shown by any previously known temperature sensitive resistors.

A number of uses for the resistors of the present invention have already been mentioned but several additional specific uses may be pointed out herein. In a great many fields and particularly in radio, fixed resistors for use at room temperature are desired which have very high actual resistances of the order of one or more megohms. By varying the physical dimensions of a resistor unit composed of one of the titanate compositions the following ranges may be constructed.

| | Ohms |
|---|---|
| Magnesium titanate | $10^{16}$–$10^{13}$ |
| Zinc titanate | $10^{13}$–$10^{10}$ |
| Cadmium titanate | $10^{12}$–$10^{9}$ |

An extremely important feature of such megohm resistors is the ability to readily determine the exact resistance without the necessity of accurately measuring such extremely high resistances which require very careful work and expensive equipment. With materials of the constant temperature coefficient of those of the present invention, the resistor may be brought to a convenient constant elevated temperature below its critical temperature and the relatively low resistance measured by simple standard methods. Then the resistance at room temperature can be simply calculated from the known temperature coefficient of resistance.

Where variable resistors are required, the resistance across the terminals attached to a titanate resistor may be made to vary continuously by varying continuously the temperature of the resistor material between the two electrodes. A simple construction permitting this comprises a suitable sized portion of the resistance material with electrodes having their ends coaxially disposed and separated by several millimeters and with a thin platinum wire disposed in the material at right angles to the direction of the electrode wires and between and separate therefrom, with both the electrodes and the heating wire in good electrical and thermal contact with the resistor material. With this arrangement, if the terminations of the electrodes are as close together as stated above, and therefore close to the heating wire, and if the temperature of the outer part of the resistor is low due to thermal radiation then there will be a rapid change in the resistance across the electrodes when the temperature of the heating wire is suddenly changed. This results partially from the closeness of the ends of the electrodes to the heating wire and partially to the property of the titanate resistor of conducting heat more rapidly when hot than when cold which permits a large thermal gradient to exist in such material. The thermal inertia of the resistor element may be made very small by employing a small element with thin electrodes and heating wire. The temperature of the heating wire is controllable by varying the voltages across its terminals by standard methods and by calibrating the voltage against the resistance across the resistor electrodes any desired resistance may be obtained by applying a known voltage across the heating wire.

The upper limit of the temperature of the resistor element in the neighborhood of its electrode terminations is approximately 800° C. and thus the available ranges of resistance for the three titanates resistor species modified as above will be as follows:

| | | Ohms |
|---|---|---|
| 0°–800° | $MgO.TiO_2$ | $10^{16}$–$10^5$ |
| 0°–560° | $ZnO.TiO^2$ | $10^{13}$–$10^4$ |
| 560°–800° | $ZnO.TiO_2$ | $10^5$–$10^3$ |
| 0°–350° | $CdO.TiO_2$ | $10^{13}$–$10^4$ |
| 350°–800° | $CdO.TiO_2$ | $10^5$–$10^2$ |

For use in circuits where the heating potential and that across the resistor must be electrically separated various obvious arrangements may be resorted to.

The use of the titanate resistors for resistance thermometers will be handled in a more or less conventional manner by measuring the voltage drop across the variable resistor in series with a fixed resistance or by measuring the current flowing through the resistor at a constant voltage, etc. Because of the tremendous changes in resistance available with relatively small changes in temperature the measuring equipment required may be quite elementary and cheap and even if its accuracy is not high nevertheless it will indicate thermal readings to relatively close tolerances.

Magnesium titanate is most useful for measuring temperatures from about 745 to 1600° C., a range which includes most commercial furnace temperatures used in the ceramic, glass and metallurgical arts. Zinc titanate is most useful in the temperature range from room temperature to 560° C. and cadmium titanate, from room temperature to 350° C. It will thus be seen that the three materials permit temperature measurements ranging from zero to 1600° C. but where great accuracy at low temperatures is not required the magnesium titanate can be used to cover the whole range.

I claim:

1. A negative resistance-temperature coefficient resistance material consisting of a titanate of a metal exclusive of mercury of group IIA of the periodic table of elements.

2. A negative resistance-temperature coefficient resistance material consisting of magnesium titanate.

3. A negative resistance-temperature coefficient resistance material consisting of zinc titanate.

4. A negative resistance-temperature coefficient resistance material consisting of cadmium titanate.

5. The method of making a negative resistance-temperature coefficient resistance material comprising mixing finely divided titanium dioxide in molecular proportions with a finely divided monoxide of a metal selected from the group containing magnesium, zinc and cadmium, and combining the oxides into a true titanate by heating the mixture to a melting temperature.

6. The method of making a negative resistance-temperature coefficient resistance material comprising mixing finely divided titanium dioxide in molecular proportions with a finely divided monoxide of a metal selected from the group containing magnesium, zinc and cadmium, combining the oxides into a true titanate by heating the mixture to a melting temperature and heat treating the mixture at a dull red heat to convert all titanium present to the tetravalent form.

7. The method of making a resistor having a negative resistance-temperature coefficient comprising melting and casting in atmosphere about two spaced terminal conductors a bead of a titanate of a metal selected from the group consisting of magnesium, zinc and cadmium and subsequently heat treating the bead until it is a clear, transparent substantially colorless mass.

8. The method of making a resistor having a negative resistance-temperature coefficient comprising melting and casting in atmosphere about the spaced ends of a pair of platinum wires a bead of a single crystalline phase of a metallic titanate and treating the bead to reduce all titanium therein to the tetravalent form.

9. An electrical resistor formed as a shaped, self-bonded, coherent, monolithic, single crystalline phase structure consisting of a chemical compound having the formula $MO.TiO_2$ where M is magnesium, zinc or cadmium.

10. An electrical resistor consisting of a metallic titanate whose curve of negative resistance-temperature coefficient contains a definite point of inflexion at a critical temperature above which the coefficient is less negative than below.

11. An electrical resistor consisting of a metallic titanate whose curve of negative resistance-temperature coefficient contains a definite point of inflexion at a critical temperature above and below which the coefficient is constant.

12. An electric resistance element containing titanium and magnesium in a single crystalline phase.

13. An electric resistance element of monolithic form and of sufficient size to be used alone containing titanium and zinc, said element being of a single crystalline phase.

14. An electric resistance element containing titanium and cadmium.

FREDERICK GORDON SMITH.